United States Patent
Brooks et al.

(10) Patent No.: US 10,243,828 B2
(45) Date of Patent: *Mar. 26, 2019

(54) MANAGING CONNECTIONS FOR DATA COMMUNICATIONS USING HEARTBEAT MESSAGING

(71) Applicant: INTERNATIONAL BUSINESS MACHINES CORPORATION, Armonk, NY (US)

(72) Inventors: Michael D. Brooks, Hursley (GB); Alan Hollingshead, Hursley (GB); Julian C. Horn, Hursley (GB); Philip I. Wakelin, Winchester Hants (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/294,857

(22) Filed: Oct. 17, 2016

(65) Prior Publication Data

US 2017/0302556 A1    Oct. 19, 2017

Related U.S. Application Data

(63) Continuation of application No. 15/132,457, filed on Apr. 19, 2016.

(51) Int. Cl.
*H04L 12/26* (2006.01)
*G06F 11/07* (2006.01)
(Continued)

(52) U.S. Cl.
CPC ........ *H04L 43/103* (2013.01); *G06F 11/0793* (2013.01); *H04L 41/0645* (2013.01);
(Continued)

(58) Field of Classification Search
CPC ..... H04L 41/06; H04L 43/04; H04L 43/0811; H04L 43/0823; H04L 43/10;
(Continued)

(56) References Cited

U.S. PATENT DOCUMENTS

| 4,860,006 A  * | 8/1989 | Barall ................ H04L 12/403 |
| | | 370/447 |
| 6,370,656 B1 * | 4/2002 | Olarig ................ G06F 11/0721 |
| | | 709/201 |

(Continued)

OTHER PUBLICATIONS

"Automated and Optimised Heartbeat Function for IP Connections" IP.com Priro Art Database Technical Disclosure; IP.com No. IPCOM000220090D; Publication Date: Jul. 20, 2012; 4 pages.*

(Continued)

*Primary Examiner* — Alpus Hsu
(74) *Attorney, Agent, or Firm* — Cantor Colburn LLP; Steven Chiu

(57) ABSTRACT

A system, computer-implemented method and computer program performs heartbeat messaging for managing connections for data communications. In one example method, an indication of a problem associated with a connection for data communication in a computing system or network is received. In response to receiving the indication, a heartbeat message is sent over the connection. The method monitors for a heartbeat response to the heartbeat message within a predefined heartbeat time interval. If a heartbeat response is received within the predefined heartbeat time interval, the method determines that the indication of a problem associated with the connection is invalid. If a heartbeat response is not received within the predefined heartbeat time interval, the method determines that the indication of a problem associated with the connection is valid.

8 Claims, 3 Drawing Sheets

(51) Int. Cl.
*H04L 12/703* (2013.01)
*H04L 12/24* (2006.01)

(52) U.S. Cl.
CPC .......... *H04L 41/0695* (2013.01); *H04L 43/04* (2013.01); *H04L 43/0811* (2013.01); *H04L 43/0823* (2013.01); *H04L 43/10* (2013.01); *H04L 45/28* (2013.01)

(58) Field of Classification Search
CPC .... H04L 43/103; H04L 43/50; G06F 11/0766; G06F 11/3003; G06F 11/3055; G06F 11/3065; G06F 11/3089
See application file for complete search history.

(56) References Cited

U.S. PATENT DOCUMENTS

| | | | | |
|---|---|---|---|---|
| 7,287,252 B2* | 10/2007 | Bussiere | ............ | G06F 11/3495 709/217 |
| 7,373,433 B2* | 5/2008 | Vageline | ............ | G06F 11/1482 710/14 |
| 7,523,197 B2* | 4/2009 | Castaneda | ............ | H04L 67/025 709/224 |
| 7,761,616 B2* | 7/2010 | Vageline | ............ | G06F 11/2092 710/14 |
| 7,778,191 B2* | 8/2010 | Sun | ................... | H04L 29/12292 370/241 |
| 7,886,295 B2* | 2/2011 | Burger | ................... | G06F 9/546 714/25 |
| 8,065,279 B2* | 11/2011 | Errickson | ........... | G06F 11/0727 707/687 |
| 8,156,219 B2* | 4/2012 | Qiu | ..................... | H04L 41/0663 709/224 |
| 8,301,937 B2* | 10/2012 | Joy | ..................... | G06F 11/0715 714/38.1 |
| 8,327,125 B2* | 12/2012 | Zhang | ..................... | G06F 21/72 713/1 |
| 8,525,664 B2* | 9/2013 | Hadizad | .................. | H04L 1/188 340/505 |
| 8,654,650 B1* | 2/2014 | Vermeulen | ........ | G06F 17/30362 370/241 |
| 8,843,622 B1* | 9/2014 | Graham | .................. | H04L 67/24 370/241 |
| 8,963,713 B2* | 2/2015 | Dawes | .................. | G06Q 50/06 340/545.6 |
| 8,973,018 B2* | 3/2015 | Gaikwad | ............ | G06F 11/1443 714/E11.002 |
| 9,009,710 B2* | 4/2015 | Xie | ..................... | H04L 43/0811 370/242 |
| 9,071,887 B2* | 6/2015 | Yao | ..................... | H04N 21/2387 |
| 9,137,268 B2* | 9/2015 | Yang | .................. | H04L 65/1066 |
| 9,591,083 B1* | 3/2017 | Gumbula | ............. | H04L 67/145 |
| 9,747,183 B2* | 8/2017 | Bhattacharya | ...... | G06F 11/3027 |
| 9,842,013 B2* | 12/2017 | Arjun | .................. | G06F 11/0757 |
| 2007/0192652 A1* | 8/2007 | Kao | ..................... | G06F 11/0709 714/4.2 |
| 2008/0285436 A1* | 11/2008 | Robinson | ............ | H04L 12/4633 370/217 |
| 2012/0176986 A1* | 7/2012 | Rudland | ............. | H04W 40/248 370/329 |
| 2012/0240119 A1* | 9/2012 | Xie | ..................... | H04L 43/0811 718/100 |
| 2015/0325106 A1* | 11/2015 | Dawes | .................. | G06Q 50/06 340/506 |
| 2018/0034692 A1 | 2/2018 | Brooks et al. | | |
| 2018/0034917 A1 | 2/2018 | Brooks et al. | | |

OTHER PUBLICATIONS

Brooks et al.; Pending U.S. Appl. No. 15/091,648; entitled "Monitoring Connections For Data Communications", filed Apr. 7, 2016.
Brooks et al.; Pending U.S. Appl. No. 15/294,842; entitled "Monitoring Connections For Data Communications", filed Oct. 17, 2016.
Brooks et al.; Pending U.S. Appl. No. 15/132,457; entitled "Managing Connections for Data Communications Using Heartbeat Messaging", filed Apr. 19, 2016.
List of IBM Patents or Patent Applications Treated as Related; (Appendix P), Filed Oct. 17, 2016; 2 pages.
List of IBM Patents or Patent Applictions Treated as Related; (Appendix P), Date filed Jun. 8, 2018; 2 pages.
Brooks, Michael D. et al., Pending U.S. Appl. No. 16/028,454, filed Jul. 6, 2018; Entitled System and Method for Managing Connections for Data Communications.
List of IBM Patents or Patent Applictions Treated as Related; (Appendix P), Date filed Jul. 6, 2018; 2 pages.

* cited by examiner

MANAGING CONNECTIONS FOR DATA COMMUNICATIONS USING HEARTBEAT MESSAGING

DOMESTIC PRIORITY

This application is a continuation application of the legally related U.S. Ser. No. 15/132,457 filed Apr. 19, 2016, the contents of which are incorporated by reference herein in their entirety.

BACKGROUND

The present invention relates to data communications, and, more specifically, to the management of connections for data communications in a computing system or network.

SUMMARY

According to an aspect of the present disclosure, a computer-implemented method is provided. The method receives an indication of a problem associated with a connection for data communication in a computing system or network. In response to receiving the indication, the method sends a heartbeat message over the connection. The method monitors the connection for a heartbeat response to the heartbeat message within a predetermined heartbeat time interval. If a heartbeat response is received within the predetermined heartbeat time interval, the method determines that the indication of a problem associated with the connection is invalid. If a heartbeat response is not received within the predetermined time interval, the method determines that the indication of a problem associated with the connection is valid.

According to another aspect of the present disclosure, an apparatus is provided. The apparatus comprises a device for communicating data over at least one connection. The device comprises a connection manager configured to receive an indication of a problem associated with a connection for data communication in a computing system or network. In response to receiving the indication, the connection manager is configured to send a heartbeat message over the connection. The connection manager is further configured to monitor the connection for a heartbeat response to the heartbeat message within a predetermined heartbeat time interval. The connection manager is configured to determine that the indication of a problem associated with the connection is invalid if a heartbeat response is received within the predetermined heartbeat time interval. The connection manager is configured to determine that the indication of a problem associated with the connection is valid if a heartbeat response is not received within the predetermined heartbeat time interval.

According to yet another aspect of the present disclosure, a computer program product is provided. The computer program product comprises a computer readable storage medium having program instructions embodied therewith. The program instructions are executable by a processor to cause the processor to: receive an indication of a problem associated with a connection for data communication in a computing system or network; send a heartbeat message over the connection in response to receiving the indication, and monitor for a heartbeat response to the heartbeat message within a predetermined heartbeat time interval. Furthermore, the program instructions are executable by a processor to cause the processor to: determine that the indication of a problem associated with the connection is invalid, if a heartbeat response is received within the predetermined heartbeat time interval, or determine that the indication of a problem associated with the connection is valid, if a heartbeat response is not received within the predetermined heartbeat time interval.

BRIEF DESCRIPTION OF THE DRAWINGS

Example implementations of the present disclosure will be described below with reference to the following drawings, in which.

DETAILED DESCRIPTION

Figure 1:
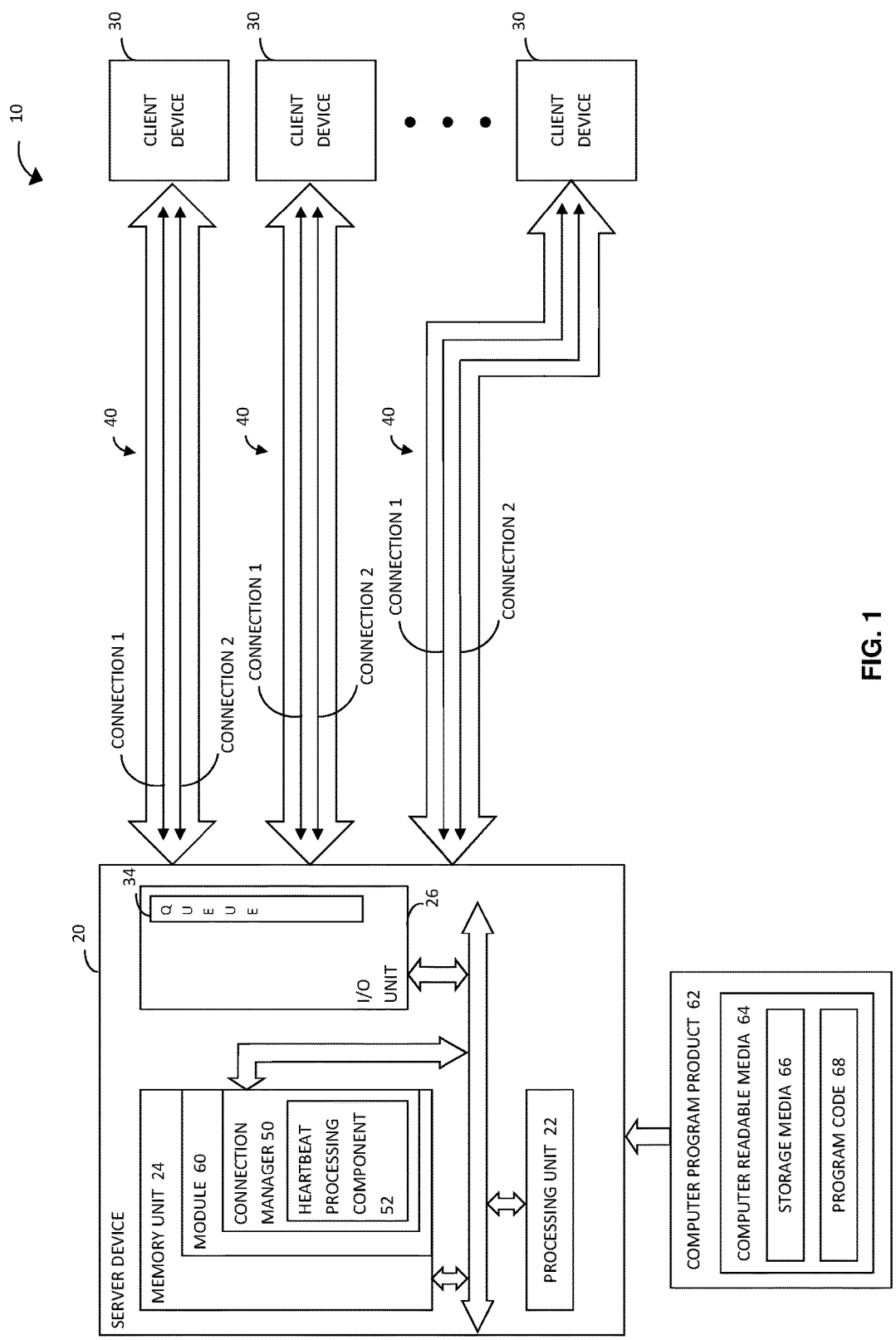
FIG. 1 is a block diagram of a computing system or network in accordance with an example implementation of the present disclosure.

In computing systems and networks, multiple connections may be used for the communication of data between components and devices. A connection may be regarded as a path for the communication of data between two nodes in a system or network. Such connections may take the form of logical connections over physical wired or wireless links, and logical connections may be viewed at any of a number of different levels of the seven-layer OSI model (or equivalent). In the following description, the term "connection" is intended to encompass both logical connections, for example at the Session layer or Transport layer of the OSI model, and physical connections. As the skilled person will appreciate from the following description, the described connections are typically "stateful" connections, whereby information about the connections is maintained.

Connections may carry large volumes of data traffic in order for the components or devices at the nodes, and thus the overall system or network, to operate efficiently. For example, an IP connection may carry requests from a device operating as a client to a device operating as a server. The server may process the requests and send responses to the client over the IP connection. In some applications, the server may receive and process large volumes of requests, and send large volumes of responses, over a single IP connection sequentially (i.e., by serial communication) or over multiple IP connections substantially concurrently (i.e., by parallel communication). For example, middleware components used in IP computer networks may receive, and respond to, large volumes of requests from individual client components over a single IP connection or multiple IP connections.

If a connection for communicating data becomes inactive (i.e., stops communicating data), data requests may be held up in the client device and data responses may be held up in the server device leading to bottlenecks within the system or network, and eventually a stall condition. Accordingly, some existing systems and networks use techniques for identifying when a connection has become inactive.

In addition, if a connection for communicating data becomes degraded, for example in quality or performance, data requests may also be held up in the client device and/or data responses may also be held up in the server device. For example, a degraded connection may communicate data intermittently and/or at reduced communication rates. In consequence, a degraded connection may lead to a reduced data communication rate, which, in turn, also may lead to bottlenecks in the system or network, and eventually a stall condition.

In co-pending U.S. patent application Ser. No. 15/092,648, filed Apr. 7, 2016, Michael D. Brooks et al entitled: "Monitoring Connections for Data Communications", the current inventors propose techniques for identifying when a connection for data communications in a system or network has become degraded.

The present disclosure is concerned with techniques for responding to an indication of a problem associated with a connection, for example, an event indicating that a problem with a connection has been identified, such as when a connection has been identified as underperforming or degraded. In particular, the present disclosure proposes techniques for validating that a connection is underperforming or degraded, using heartbeat technology.

Heartbeat technology is an established technique for managing network connections, which is used by network devices, such as middleware components, to periodically check the validity of connections. In particular, a network device may periodically send a heartbeat message on each established connection to another device and monitor for a heartbeat response from the device during a subsequent time period known as the heartbeat interval. If a response to the heartbeat message is received within the heartbeat interval, the connection is considered to be valid (i.e., its performance or health status is "normal"). The format of a heartbeat message, the time period between heartbeat messages and the heartbeat interval are predefined according to the application. In order to avoid network congestion and/or processing overhead, the size of a heartbeat message/response is typically relatively small (e.g., a payload of 1 byte and an overall size of 100-150 bytes) and the heartbeat interval is typically relatively long (e.g., 60 seconds). Accordingly, in the case that a connection is degraded, but still transmitting data, a single byte of data received during the heartbeat interval may be sufficient for a determination that the connection is performing normally.

In addition, systems may use multiple transmission sessions (e.g., TCP/IP sockets over an IP connection) for the communication of data between two components or devices, in order to improve performance. In this scenario, the current inventors have recognized that a subset of these sessions may stall, thus congesting large numbers of processing requests/responses to and from a server device. However, conventional heartbeat technology is unlikely to be able to detect or validate this problem for a number of reasons. First, the heartbeat messages/responses are able to use a transmission session/socket that is performing normally, thereby circumventing the degraded connection(s). Secondly, if a stalled transmission session/socket is congested (i.e., the input/output queues of the corresponding components are full) then the heartbeat messaging would fail in a retrievable manner, whereby the heartbeat technology would try to allocate a new transmission session. This is treated as a "soft error" since such congestion may be a symptom of heavy processing load rather than a "hard error" signifying a network problem or failure.

Example implementations of the present disclosure include systems, methods and computer program products for validating an indication or determination of a problem associated with a connection, such as an indication or determination that a connection for data communications has become degraded. For example, the disclosed techniques may verify the acceptability of at least one of quality, quantity or speed of data communication over a connection or the efficiency of the bidirectional flow of data over the connection in order to validate an indication or determination of a problem associated with the connection.

FIG. 1 shows an example of a computer system or network in accordance with an example implementation of the present disclosure. The system 10 comprises a server device 20 and one or more client devices 30. As the skilled person will appreciate, the number of devices and their respective functions in the system 10 illustrated in FIG. 1 is by way of example only. In other example implementations, a system may include any number of server and client devices, and any individual device may perform the functions of both a server and a client, according to the application.

Data is communicated between the server device 20 and each client device 30 over at least one connection 40. For simplicity, the illustrated system 10 includes just two connections 40, called "Connection 1" and "Connection 2", between the server device 20 and each client device 30 although any number of connections 40 are possible. Connections 40 comprise established bidirectional communication paths between the server device 20 and a client device 30 over wired or wireless communication links. For example, in the context of a TCP/IP network, wired links may be provided by copper or optical fiber-based cables such as Ethernet, Digital Subscriber Line (DSL), Integrated Services Digital Network (ISDN), Fiber Distributed Data Interface (FDDI) or another type of network-compatible cable and wireless links may be established by any form of wireless technology such as Bluetooth™. As shown in FIG. 1, multiple connections 40 may be provided over each wired or wireless link of the network, for example as multiple independent transmission sessions (or equivalent). Similarly, in the context of a computing system, connections 40 may be established over wired links such as conductive interconnect or any type of wired or wireless system bus.

A client device 30 may send a request as a data communication over a connection 40 (e.g., Connection 1), to the server device 20 and, in response to receiving and processing the request, the server device 20 may send a response as a data communication over the same connection 40 (i.e., Connection 1), to the client device 30.

Server device 20 includes a processing unit 22 for processing requests to produce responses, a memory unit 24 for storing data and an input/output (I/O) unit 26. The I/O unit 26 may be any suitable network interface for enabling communication of data over connections 40 to and from client devices 30. The I/O unit 26 comprises an output queue 34 for sending data responses as data communications over the connections 40 to the client devices 30. In example implementations, each response may comprise one or more network packets (e.g., TCP/IP packets in the case of an IP connection) of standard or predetermined form having inter alia a header containing control information and a payload containing data. The header includes source and destination addresses and packet length, indicative of the amount of data contained in the payload (e.g., in bytes). In other example implementations, each response may be in the form of a bit stream of data of arbitrary length (e.g., in bytes), which corresponds to the amount of memory (e.g., in bytes) occupied by the response, for example in the output queue 34. The server device 20 may output responses from the output queue 34 over the connections 40 as a serialized stream of data.

Server device 20 further includes a connection manager 50 in accordance with an example implementation of the present disclosure. The connection manager 50 monitors data communications to and from the I/O unit 26 over connections 40, and maintains data including data records for monitored data communication for each connection 40.

The server device 20, and in particular, although not exclusively, the connection manager 50 may include a heartbeat processing component 52, in accordance with an example implementation of the present disclosure. In example implementations, the heartbeat processing component 52 may be configured to perform conventional (e.g., periodic) heartbeat processing, in addition to heartbeat processing in accordance with the present disclosure, as described below. In this case, the heartbeat processing of the present disclosure may represent an enhancement of the existing (i.e., conventional) heartbeat technology. In other example implementations, the heartbeat processing component 52 may be a dedicated component configured to perform heartbeat processing in accordance with the present disclosure. The heartbeat processing component 52 may be configured to perform a method in accordance with the present disclosure, such as the methods described below with reference to FIGS. 2 and 3.

In example implementations, the connection manager 50, and in particular, although not exclusively, the heartbeat processing component 52, may comprise a software module 60 including computer-executable instructions. The software module 60 may be installed on the server device 20 from a computer program product 62 comprising computer readable media 64 having storage media 66 and program instructions or code 68 embodied therewith. The software module 60 may be uploaded to the server device 20 and stored in memory unit 24. The computer-executable instructions of the software module 60 may be executed by processing unit 22 to perform a method in accordance with an example implementation of the present disclosure, for example by performing heartbeat processing over each connection 40. The skilled person will appreciate that the connection manager 50 and the heartbeat processing component 52 may be implemented in any suitable form including software, firmware, and/or hardware.

Figure 2:
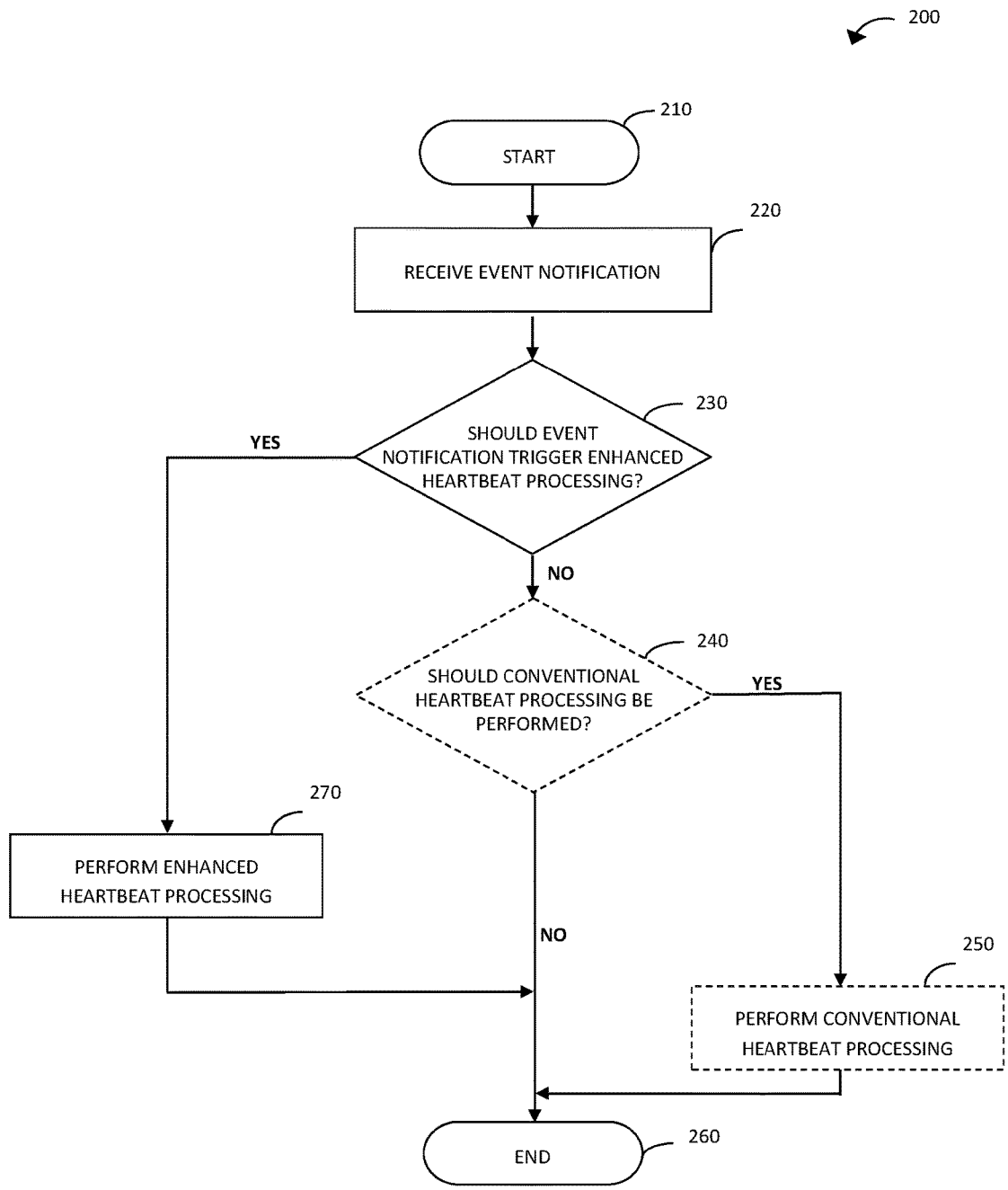
FIG. 2 is a flowchart illustrating a method in accordance with an example implementation of the present disclosure.

FIG. 2 is a flowchart illustrating a method in accordance with an example implementation of the present disclosure. In particular, although not exclusively, the illustrated method may be performed by the connection manager of the server of FIG. 1. The method may be used, for example, to validate determinations that a connection for data communication is degraded or otherwise underperforming. The described method may perform heartbeat processing (hereinafter called "enhanced heartbeat processing" to distinguish from conventional (e.g., periodic) heartbeat processing) on a single connection for data communications. As the skilled person will appreciate, the method may perform enhanced heartbeat processing on multiple connections, either sequentially or concurrently.

The method 200 starts at step 210. At step 220, the method receives an event notification, for example indicating that the performance of a connection is considered to be degraded. One or more types of event notification or other indication may be predefined for triggering enhanced heartbeat processing in accordance with the present disclosure, in order to validate the indication, and, in consequence, the connection, such as its status or performance. Thus, the received event notification has a notification type and includes an identifier of the corresponding connection. The event notification may be received from another method, which may be performed by the connection manager of the server of FIG. 1 or elsewhere, for example as described in co-pending U.S. patent application Ser. No. 15/092,648, filed Apr. 7, 2016, Michael D. Brooks et al entitled: "Monitoring Connections for Data Communications" supra. As the skilled person will appreciate, notifications of events relating to a connection other than indications of degraded performance may be used to trigger enhanced heartbeat processing. For example, an event notification, which indicates that a connection is perceived to be unreliable or otherwise problematic as a result of its operation, performance or behavior, as an additional or alternative trigger for enhanced heartbeat processing.

At step 230, the method determines whether the received event notification has a predefined type for triggering enhanced heartbeat processing in accordance with the present disclosure. If step 230 determines that the received event notification should trigger enhanced heartbeat processing, the method proceeds to step 270. At step 270, enhanced heartbeat processing is performed over the identified connection, for example as described in more detail below with reference to FIG. 3, and the method ends at step 260. In example implementations, the enhanced heartbeat processing uses an expedited call procedure, for example using a control session for the identified connection to allow for out-of-band communication of heartbeat messages to avoid any time delay. However, if step 230 determines that the received event notification should not trigger enhanced heartbeat processing, the method proceeds to optional step 240. At step 240 the method may optionally determine whether other conditions for heartbeat processing are met, for example, conditions for conventional (e.g., periodic) heartbeat processing are met, such as the expiry of a time period since the last periodic heartbeat messaging for the connection. If step 240 determines that such conditions are met, the method proceeds to step 250 and performs conventional heartbeat processing over the connection. This may be appropriate in example implementations in which the method for enhanced heartbeat processing is integrated with a method for conventional (e.g., periodic) heartbeat processing. Otherwise, the method may end at step 260.

Figure 3:
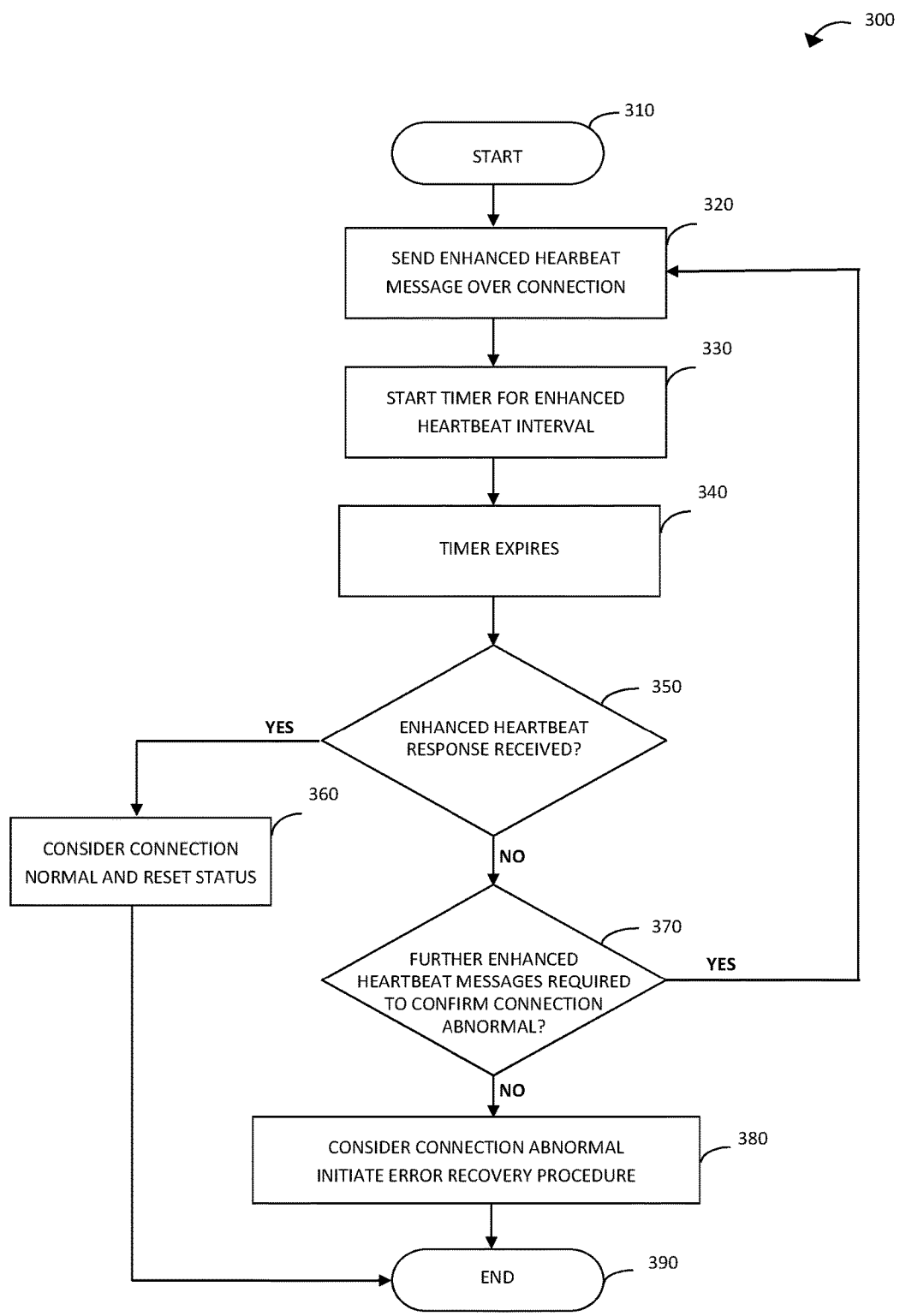
FIG. 3 is a flowchart illustrating a method for heartbeat processing in accordance with an example implementation of the present disclosure.

FIG. 3 is a flowchart illustrating a method for enhanced heartbeat processing in accordance with an example implementation of the present disclosure. In particular, although not exclusively, the illustrated method may be performed by the connection manager of the server of FIG. 1. For example, the method of FIG. 3 may be used in step 270 of the method described above with reference to FIG. 2, in order to determine the validity of the event notified in the event notification received at step 220. The method of FIG. 3 performs enhanced heartbeat processing on a single connection for data communications. As the skilled person will appreciate, the method may perform heartbeat processing on multiple connections, either sequentially or concurrently.

The method 300 starts at step 310, following a determination that enhanced heartbeat processing on an identified connection is required. At step 320, the method sends an enhanced heartbeat message over the identified connection. The enhanced heartbeat message may comprise an increased data payload compared to a conventional heartbeat message used in conventional (e.g., periodic) heartbeat processing. For example, the enhanced heartbeat message may comprise one or more maximum transmission units (MTUs) of data for the connection. In example implementations, the enhanced heartbeat message may include a data payload of more than 1500 bytes; in this case, for a TCP/IP connection, for which the MTU is 1500 bytes, the enhanced heartbeat message may comprise multiple MTUs. In example implementations, the enhanced heartbeat message may include a data payload that is at least 5 times and typically at least 10 times the size (e.g., in bytes) of a conventional heartbeat message for the connection; in this latter case, for a conventional, periodic heartbeat message of 100-150 bytes in size, the enhanced heartbeat message would comprise at least 1000-1500 bytes.

At step 330, the method starts a timer for an enhanced heartbeat interval and waits for a response to the enhanced heartbeat message. The duration of the enhanced heartbeat interval may be relatively short in order that the acceptability of the data communication rate, the data communication quality, or both, over the connection can be verified. Thus, for example, the duration of the enhanced heartbeat interval may be a shorter period of time that a conventional heartbeat interval used in conventional (e.g., periodic) heartbeat processing. In example implementations, the enhanced heartbeat interval may be determined using the conventional heartbeat interval for the connection. For example, the enhanced heartbeat interval may be a predefined function of the conventional heartbeat interval for the connection, such as 30% to 50% thereof. In example implementations, the enhanced heartbeat interval may be determined using a typical round trip time for data communication over the connection, which may be available as historical data. As the skilled person will appreciate, a suitable time interval for the enhanced heartbeat interval will be dependent upon the application, such as the type of connection and its typical performance In particular, the enhanced heartbeat interval may be a selected time period that it is sufficiently short to properly identify an unacceptable data communication rate but not too short as to identify a data communication rate just within the typical range as unacceptable, and thus lead to false positive determinations. In example implementations, the enhanced heartbeat interval may be in the range of 10 to 30 seconds. After the enhanced heartbeat interval has elapsed, the timer expires at step 340, and, at step 350, the method determines whether an enhanced heartbeat response has been received over the connection in response to the enhanced heartbeat message.

The enhanced heartbeat response may include a data payload equivalent to the data payload of the enhanced heartbeat message. Thus, in example implementations as described above, the enhanced heartbeat response may include a data payload of: one or more MTUs of data for the connection; 1500 bytes or more, or at least 5 times (and typically at least 10 times) the size of a conventional heartbeat message for the connection. In example implementations, step 350 may determine that an enhanced heartbeat response has been received if the entire data payload of the enhanced heartbeat message has been received in the enhanced heartbeat interval. In this way, the efficiency of the flow of data, in terms of quality (e.g., accuracy of data communicated) as well as quantity and speed (e.g., the time taken for the flow of data), can be verified based on a sufficient, non-trivial quantity of communicated data. In example implementations, the data payload in the enhanced heartbeat message, the data payload in enhanced heartbeat response, and/or a combination of the two, is sufficient to verify the effective bi-directional flow of data over the connection.

If step 350 determines that an enhanced heartbeat response has been received, the event notification may be invalid, and the method proceeds to step 360 At step 360, the method determines that the performance of the connection is normal (i.e., within typical or expected limits for the connection). This may arise, for example, if the problem associated with the connection such as degraded performance, indicated by the event notification, was temporary or has since been resolved. Accordingly, step 360 may send a notification to a component that sent the event notification, or another component, to reset the status of the connection, in a connection status log thereof, from "abnormal" to "normal" (or equivalent) or step 360 may directly reset the status of the connection in a connection status log. The method may then end at step 390.

Returning to step 350, if, however, step 350 determines that an enhanced heartbeat response has not been received, the event notification may be valid, and the method proceeds to step 370. At step 370, the method determines whether one or more further enhanced heartbeat message attempts are required before a determination that the event notification is valid (i.e., the performance of the connection is abnormal, and thus outside the typical or expected limits for the connection) can be confirmed. For example, the method may require a predetermined number N of enhanced heartbeat message attempts on a connection before the notified event can be validated. Typically, the predetermined number of enhanced heartbeat message attempts N is between 1 and 5, dependent upon the application. If step 370 determines that another enhanced heartbeat message is required (i.e., N>1 in the first instance), the method returns to step 320 and repeats steps 320 to 370, as described above, until N enhanced heartbeat message attempts have been completed. If, however, step 370 determines that no further enhanced heartbeat messages are required (i.e., N=1 in the first instance, or if N>1 when N enhanced heartbeat message attempts have been completed), the method continues with step 380.

As the skilled person will appreciate, any suitable process may be used to track the number of enhanced heartbeat message attempts that have been made by the method. For example, a counter that is initially set to 0 may increment by 1 each time an enhanced heartbeat message is sent at step 320, and the value of the counter may be compared to the predetermined number N at step 370. Various other techniques are possible and contemplated by the present disclosure.

At step 380, the method determines that the event notification is valid (i.e., the performance of the connection is abnormal). This may arise, for example, in the event of continuing problems associated with the connection such as degraded performance, indicated by the event notification. Accordingly, step 380 may further initiate an error recovery procedure for the connection. In example implementations, step 380 may initiate an error recovery procedure by sending a notification to the component that sent the event notification, or to another component of the connection manager, indicating the determination that the notified event is valid and the error recovery procedure is required. In other example implementations, step 380 may directly perform an error recovery procedure. As the skilled person will appreciate, step 380 may involve any suitable technique to initiate an error recovery procedure for the connection, which may be performed by any suitable component of the computing system or network.

An example error recovery procedure may be any suitable conventional or another process for handling failed and failing network connections, which is selected according to the application. In example implementations, the error recovery procedure may involve terminating the connection in a timely and orderly manner and appropriately managing outstanding data communications. As the skilled person will appreciate, any suitable error recovery procedures may be used. The method may then end at step 390.

As the skilled person will appreciate, various modifications may be made to the method of FIG. 3. For example, before step 360 determines that the event notification is invalid and thus the performance of the connection is normal, the method may complete another successful enhanced heartbeat message attempt, to which an enhanced heartbeat response is received. Moreover, in example implementations in which the enhanced heartbeat processing is integrated and/or performed in conjunction with conventional (e.g., periodic) heartbeat processing or other connection health monitoring processes, the method may suppress network transmission optimizations associated with other such processes. Such optimizations may include a transmission optimization flag as disclosed in IP.COM Disclosure No: IPCOM000220090D supra. Thus, for example, prior to sending an enhanced heartbeat message at step 320, the method may perform steps to ensure that another connection health monitoring process is switched off. In this way, enhanced heartbeat processing is performed without the risk of conflicting processing that may lead to false outcomes.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving an indication of a problem associated with a connection for data communication in a computing system or network;
    in response to receiving the indication, sending a heartbeat message over the connection;
    monitoring for a heartbeat response to the heartbeat message within a predefined heartbeat time interval, wherein:
        based on a determination that the heartbeat response is received within the predefined heartbeat time interval, determining that the indication of a problem associated with the connection is invalid, or
        based on a determination that the heartbeat response is not received within the predefined heartbeat time interval, determining that the indication of a problem associated with the connection is valid,
    wherein the heartbeat message comprises an enhanced heartbeat message and the heartbeat response comprises an enhanced heartbeat response, wherein a data payload of one of the enhanced heartbeat message and the enhanced heartbeat response is equal to a maximum transmission unit for the connection, such that an effective bidirectional flow of data over the connection can be verified.

2. The method of claim 1, wherein the predefined heartbeat time interval comprises an enhanced heartbeat time interval, a duration of which is shorter than a duration of a standard predefined heartbeat time interval such that an acceptability of at least one of data rate and quality of data communication over the connection can be verified.

3. The method of claim 1, wherein, based on a determination that a heartbeat response to the heartbeat message is not received within the predefined heartbeat time interval, the method further comprises:
    sending a further heartbeat message over the connection;
    monitoring for a further heartbeat response to the further heartbeat message within a further predefined time interval;
    wherein the method determines that the indication of a problem associated with the connection is valid only based on a determination that the further heartbeat response to the further heartbeat message is not received within the further predefined heartbeat time interval.

4. The method of claim 1, further comprising:
    in response to determining that the indication of a problem associated with the connection is valid, initiating an error recovery procedure for the connection.

5. The method of claim 1, wherein the indication of a problem associated with a connection comprises an event notification that a performance of the connection is degraded received from a connection manager, the method further comprising:
    in response to determining that the indication of a problem associated with the connection is invalid, sending a notification to the connection manager that the performance of the connection is no longer degraded.

6. The method of claim 1, wherein the indication of a problem associated with a connection comprises an indication that a performance of the connection has been set to degraded in a connection status log, the method further comprising:
    in response to determining that the indication of a problem associated with the connection is invalid, resetting the status of the performance of the connection in the status log to normal.

7. The method of claim 1, wherein the method is performed in combination with periodic heartbeat processing, the method further comprising:
    for each active connection:
    periodically sending the heartbeat message over the connection, the heartbeat message having a predefined heartbeat message format for the connection, and
    monitoring for a response to the conventional heartbeat message within a predefined heartbeat time interval, the predefined heartbeat interval having a predefined duration for the connection;
    wherein, based on a determination that the response is received within the predefined heartbeat time interval, setting a status of the connection as normal, or
    based on a determination that the response is not received within the predefined heartbeat time interval, setting the status of the connection as abnormal.

8. The method of claim 7, wherein:
    in response to receiving the indication, the heartbeat message comprises an enhanced heartbeat message, the heartbeat response comprises an enhanced heartbeat response and the predefined time interval comprises an enhanced heartbeat time interval, the method further comprising:

determining a data payload of the enhanced heartbeat message and the enhanced heartbeat response based on a data payload of the heartbeat message and the heartbeat response for the connection, and determining a duration of the enhanced heartbeat time interval based on the predefined time interval for the connection;

wherein the data payload of the enhanced heartbeat message is greater that the data payload of the heartbeat message, the data payload of the enhanced heartbeat response is greater that the data payload of the heartbeat response and the duration of the enhanced heartbeat time interval is less that the duration of the heartbeat time interval.

\* \* \* \* \*